G. H. WALTZ & G. T. KORNER.
HEAD LAMP CONTROL.
APPLICATION FILED APR. 9, 1915.
1,177,556.  Patented Mar. 28, 1916.
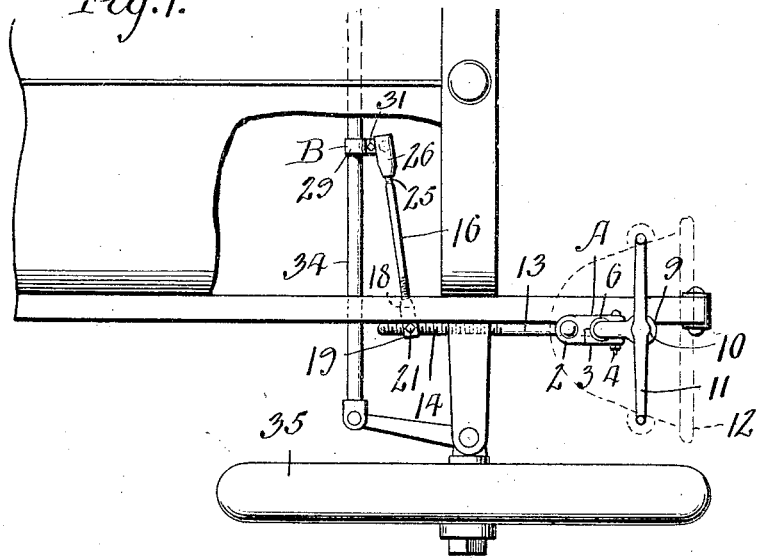
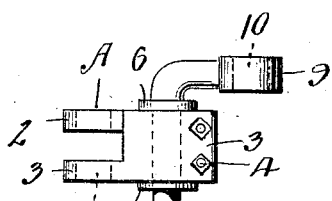
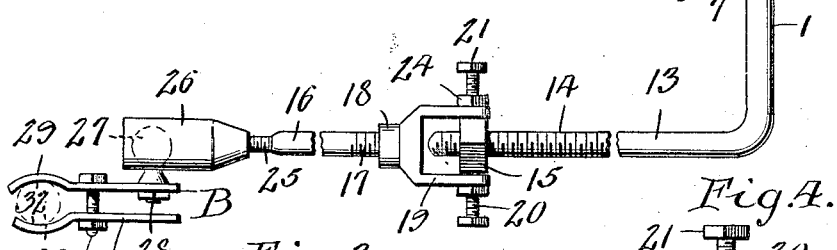
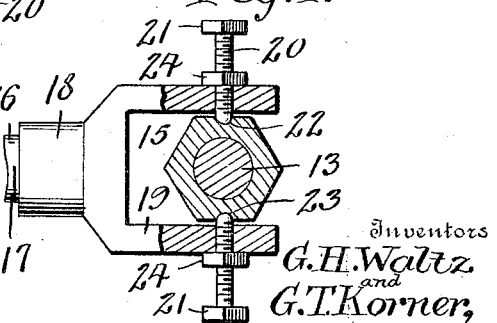

UNITED STATES PATENT OFFICE.

GAIL H. WALTZ AND GALE T. KORNER, OF ATTICA, OHIO.

HEAD-LAMP CONTROL.

1,177,556.  Specification of Letters Patent.  Patented Mar. 28, 1916.

Application filed April 9, 1915. Serial No. 20,273.

*To all whom it may concern:*

Be it known that we, GAIL H. WALTZ and GALE T. KORNER, citizens of the United States, residing at Attica, in the county of Seneca and State of Ohio, have invented new and useful Improvements in Head-Lamp Controls, of which the following is a specification.

This invention relates to headlamp controls designed with especial reference to motor vehicles, the object of the invention being to produce means operated automatically in conjunction with the steering mechanism of a vehicle of the class described, whereby the head lamps are turned simultaneously with the steering wheels at the front of the machine for the purpose of directing the illuminating rays from the head lamps upon that portion of the road way about to be followed by the machine in accordance with the angle of the steering wheels.

One of the principal objects of the present invention is to provide means whereby the range of turning movement of the head lamps may be adjusted to suit the desire of the particular owner or operator of the car upon which the lamp controlling means are mounted.

With the above and other objects in view, the invention consists in the novel construction, combination and arrangement of parts, as herein described, illustrated and claimed.

In the accompanying drawings:—Figure 1 is a plan view of a sufficient portion of an automobile to illustrate the application and operation of the present invention, which is shown applied thereto. Fig. 2 is an enlarged perspective view of the mechanism of this invention. Fig. 3 is a detail view of the split or detachable bearing for the lamp shaft. Fig. 4 is a partial sectional view of the connection between the lamp turning arm and the operating rod.

Referring to the drawings 1 designates a substantially vertical and oscillatory lamp shaft which is journaled in a bearing designated generally at A and consisting of two separable sections, 2 designating the main section and 3 a smaller section removable therefrom and secured thereto by means of a bolt 4 or its equivalent, thus enabling the lamp shaft 1 to be mounted in the bearing opening 5 formed between the sections 2 and 3, the lamp shaft being provided above and below the bearing A with positioning and bearing collars or flanges 6 and 7. The supporting bracket or bearing 2 is formed with a hole 8 extending vertically therefrom to enable said bearing to be mounted on the usual bracket now on machines of the present day type, thus facilitating the application of this invention to machines already in use.

The lamp shaft 1 comprises an upper lamp supporting arm 9 having an opening 10 therein to receive the pendent stem 11 of a head lamp represented at 12. At its lower end the shaft 1 is provided with a lamp turning arm 13 the rear end portion of which is threaded as shown at 14 and has adjustably mounted thereon a nut 15 which is therefore movable toward and away from the axis of the shaft 1 for the purpose of increasing or decreasing the range of movement of the head lamp 12 when associated with the remainder of the device.

Connected with the arm 13 through the medium of the nut 15 is an operating rod 16 having one end threaded at 17 to adjustably receive a bifurcated yoke 18. The arms 19 of the yoke are formed with threaded openings to receive threaded pivots 20 provided at their outer ends with heads 21 and having their inner ends reduced, tapered or pointed as shown at 22 to fit into sockets 23 of corresponding shape in opposite faces of the nut 15 whereby said nut is swiveled or adapted to turn. 24 designates lock nuts to fix the adjustment of the pivots 20. At its opposite end the operating rod 16 is threaded as at 25 and has threaded thereon the socket member 26 of a ball and socket joint. The ball 27 of this joint is provided with a shank 28 secured in fixed relation to the member 29 of a clamp designated generally at B and comprising in addition to the member 29 another similar member 30, said members being connected by a bolt 31 or its equivalent and the end portions of said members being reversely bowed to provide substantially semi-circular portions 32 whereby the clamp as a whole is adapted to be secured to the steering rod 34 of a motor propelled vehicle as shown in Fig. 1. The steering wheels 35 of the machine are first set facing perfectly straight ahead and then the clamp B is fastened to the steering rod 34 while the lamp 12 is facing directly forward.

From the foregoing description, taken in connection with the accompanying drawings, it will now be understood that when the machine is steered to the right or left, the movement of the steering rod 34 effects a corresponding movement of the operating rod 16 which in turn acts upon the lamp turning arm 13, causing the lamp 12 to turn in the same direction as the steering wheel 35. Individual owners or drivers sometimes prefer to have the head lamp turn through a greater number of degrees than the steering wheels and other operators prefer to have the head lamps turn through a lesser number of degrees. This may be readily accomplished by adjusting the nut 15 toward and away from the axis of the shaft 1 thereby giving a greater or less range of movement of the head lamp. The operating rod 16 is also rendered longitudinally adjustable by reason of its threaded engagement with the members 18 and 26. This permits an accurate adjustment of the lamp or lamps to be obtained without disconnecting the clamp B from the steering rod 34.

It will of course be understood that the arrangement shown in Fig. 1 may be duplicated at the opposite side of the machine where two head lamps are employed as is usually the case. Such a change as well as other changes in the form, proportion and minor details of construction may be resorted to without departing from the principle or sacrificing any of the advantages of the invention.

What we claim is:—

1. In headlamp control, a substantially vertical and oscillatory lamp-carrying shaft having a substantially horizontal and threaded lamp turning arm, an operating rod having means at one end for attachment to the steering rod of a motor vehicle, a bifurcated yoke adjustable on the other end of said rod, and a nut threaded on said lamp turning arm for adjustment toward and away from the axis of said shaft to vary the arc of movement of the lamp, said nut being pivotally supported between the arms of said yoke.

2. In headlamp control, a substantially vertical and oscillatory lamp-carrying shaft having a substantially horizontal and threaded lamp turning arm, an operating rod having means at one end for attachment to the steering rod of a motor vehicle, a bifurcated yoke adjustable on the other end of said rod, and a nut threaded on said lamp turning arm for adjustment toward and away from the axis of said shaft to vary the arc of movement of the lamp, said nut being pivotally supported between the arms of said yoke, said attaching means being adjustable longitudinally of the operating rod.

In testimony whereof we affix our signatures in presence of two witnesses.

GAIL H. WALTZ.
GALE T. KORNER.

Witnesses:
Amos W. Lake,
Charles C. Sutton.